United States Patent Office 3,499,916
Patented Mar. 10, 1970

3,499,916
BASIC DYES OF THE 1-(SUBSTITUTED AMINO)-4-AMINOETHOXYETHYLAMINOANTHRAQUINONE SERIES
Berthold Gertisser, Munchenstein, Basel-Land, Switzerland, assignor to Sandoz Ltd. (also known as Sandoz A.G.), Basel, Switzerland
No Drawing. Filed Jan. 13, 1967, Ser. No. 609,011
Claims priority, application Switzerland, Jan. 21, 1966, 864/66; Jan. 25, 1966, 1,006/66; Dec. 22, 1966, 18,386/66
Int. Cl. C09b 1/16
U.S. Cl. 260—379
8 Claims

ABSTRACT OF THE DISCLOSURE

This invention relates to basic anthraquinone dyes their production and use for dyeing polyacrylonitrile polymers or copolymers, containing a hydrazinium, ammonium or cycloimmonium radical.

---

This invention relates precisely to basic anthraquinone dyes which are free from sulphonic acid groups and have the formula

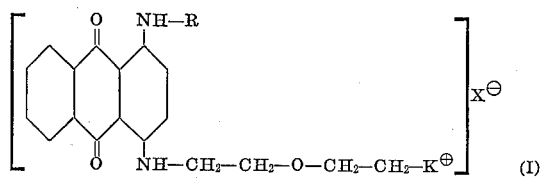
(I)

where R stands for hydrogen or an alkyl, cycloalkyl or phenyl radical which may be substituted, $K^\oplus$ for a hydrazinium, ammonium or cycloimmonium radical and $X^\ominus$ for an anion equivalent to the dye cation.

The dyes in which $K^\oplus$ stands for a hydrazinium radical correspond to the formula

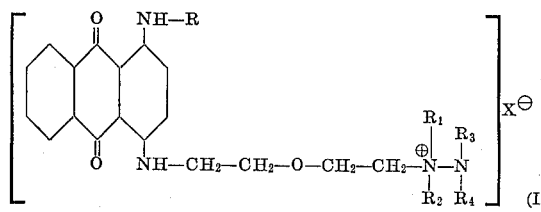
(II)

where $R_1$ stands for an alkyl, cycloalkyl or aralkyl radical which may be substituted, or, jointly with $R_2$ and the adjacent N-atom, for a heterocycle, $R_2$ for an alkyl, cycloalkyl or aralkyl radical which may be substituted, or, jointly with $R_1$ and the adjacent N-atom, for a heterocycle, and $R_3$ and $R_4$ represent hydrogen or identical or different alkyl, cycloalkyl or aralkyl radicals which may be substituted, in which formula $R_1$ together with $R_3$ and/or $R_2$ together with $R_4$ and the N-atoms adjacent to these substituents may form heterocycles.

The dyes in which $K^\oplus$ stands for an ammonium or cycloimmonium radical have the formula

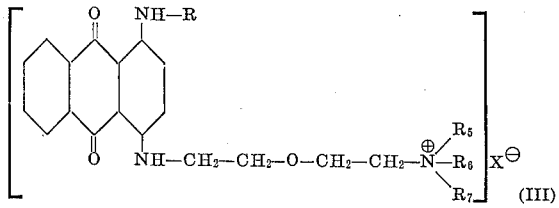
(III)

where $R_5$, $R_6$ and $R_7$ each represents an alkyl, cycloalkyl or aralkyl radical which may be substituted, and the radicals $R_5$ and $R_6$ or the radicals $R_5$, $R_6$ and $R_7$ together with the adjacent N-atom may form a heterocycle.

The dyes of Formula I can be produced by the replacement of the substituent Z in a compound of formula

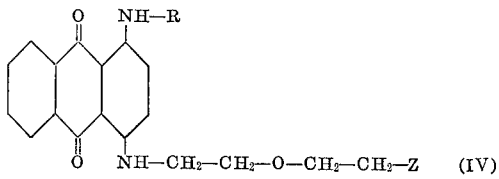
(IV)

by a group of formula

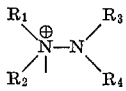

or by a group of formula

Thus, for example, the dyes of Formulae II or III can be formed by reacting one mole of an anthraquinone compound of formula

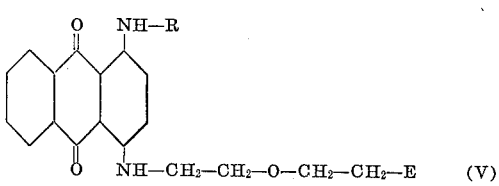
(V)

where E represents the acid radical of an ester, with one mole of a compound of formula

(VI)

to give a dye of Formula II, or with one mole of a compound of formula

(VII)

to give a dye of formula III.

When neither R, $R_3$ or $R_4$ stands for a hydrogen atom, the radicals R and $R_1$ to $R_4$ denote alkyl radicals which may be substituted, such as unsubstituted nor substituted methyl, ethyl, propyl or butyl radicals, or cycloalkyl radicals such as cyclohexyl radicals, or unsubstituted or substituted aralkyl radicals such as benzyl radicals. The radical R can stand for an optionally substituted phenyl radical. If these radicals are substituted they contain in particular a hydroxyl group, a halogen atom, e.g. a chlorine bromine or fluorine atom, or a cyano group. The phenyl radical can also be substituted by unsubstituted or substituted alkyl or alkoxy.

The radicals $R_1$ and $R_2$, conjointly with the adjacent N-atom, may form a saturated or unsaturated heterocycle, e.g. a pyrrolidine, piperazine, morpholine, aziridine or piperidine ring.

The radical $R_1$ along with $R_3$ and/or the radical $R_2$ along with $R_4$ and the N-atoms adjacent to these substituents may form a saturated or unsaturated heterocycle having preferably 5 or 6 members, for example a pyrazolidine, pyridazine or pyrazoline ring such as trimethylene-pyrazolidine or tetramethylene-pyrazolidine.

When neither R, $R_5$, $R_6$ nor $R_7$ represents an aralkyl radical and R does not stand for hydrogen or a phenyl radical, the radicals R, $R_5$ to $R_7$ may represent unsubstituted or substituted alkyl radicals such as unsubstituted or substituted methyl, ethyl, propyl or butyl radicals, or cycloalkyl radicals such as cyclohexyl radicals, or alternatively the radicals R and $R_5$ to $R_7$ may be substituted or unsubstituted aralkyl radicals such as benzyl radicals. If these radicals are substituted, they contain in particular a hydroxyl group, halogen atoms such as a chlorine, bromine or fluorine atom, or a cyano group.

The radicals $R_5$ and $R_6$ may form, together with the adjacent N-atom, a heterocycle, e.g. a saturated or unsaturated heterocycle such as a pyrrolidine, piperidine, morpholine, aziridine or piperazine ring.

The radicals $R_5$, $R_6$ and $R_7$, together with the adjacent N-atom, may form a saturated or unsaturated heterocycle, e.g. a grouping of the formula

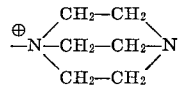

or may stand for a pyridine radical.

The anion ⊖ may be an organic or inorganic ion, e.g. a halogen ion such as those of chloride, bromide or iodide, or a methyl sulphate, sulphate, disulphate, perchlorate, phosphotungsticmolybdate, benzene sulphonate, 4-chlorobenzene sulphonate, oxalate, maleinate, acetate, propionate, methane sulphonate, chloracetate or benzoate ion, or a complex anion such as that of zinc chloride double salts.

Examples of suitable acid radicals E are those of sulphuric acid, —$SO_3OH$, and of sulphonic acids, —$SO_3$—$R_{10}$, where $R_{10}$ represents an unsubstituted or substituted hydrocarbon radical; further the radicals of hydrogen sulphide, —SH—, or of thioles, —$SR_{10}$, or preferably those of hydrohalyic acids, e.g. Cl or Br.

The reaction of a compound of Formula V with a hydrazine of Formula VI or with an amine of Formula VII is carried out preferably in an organic solvent at temperatures of —50° to +250° C., preferably in the temperature range of 20° to 80° C. The reaction can also be conducted in aqueous medium at the stated temperatures, in the presence or in the absence of an organic solvent as required.

The dyes of Formula I can be used for dyeing or printing filaments, fibres and textile materials consisting wholly or in part of acrylonitrile polymers or copolymers. The dyes are very suitable for combination and can be applied jointly to match a wide variety of shades, whether belonging to the same or different chemical classes. Besides the aforementioned textiles, they are suitable for dyeing paper and leather and for the coloration of drying oils and plastic compounds.

Acrylonitrile polymers contain more than 80% acrylonitrile, whereas acrylonitrile copolymers generally consist of 80–95% acrylonitrile and 20–5% vinyl acetate, vinyl pyridine, vinyl chloride, vinylidene chloride, acrylic acid, acrylic acid ester, methacrylic acid, methacrylic acid ester, etc.

The dyes are applied from an aqueous, preferably neutral or acid medium at the boil. They give very level dyeings on the aforenamed polymers and copolymers without retarder, although commercial retarders can be used without interference if desired. They can also be applied in autoclaves at high temperature with pressure, e.g. at temperatures up to 130° C., preferably from 107° to 118° C. The component of polyacrylonitrile fibre in blend fabrics can be successfully dyed with these dyes. It has been found that mixtures of two or more dyes of Formula I can be used with advantage.

The dyeings obtained on acrylonitrile polymers and copolymers have good fastness to light, washing, perspiration, sublimation, pleating, decatising, pressing, water, sea water, bleaching, dry cleaning, cross dyeing and solvents, and generally show good compatibility with salt.

In Example 144 of French Patent 1,325,176 a basic anthraquinone dye is described which has the formula

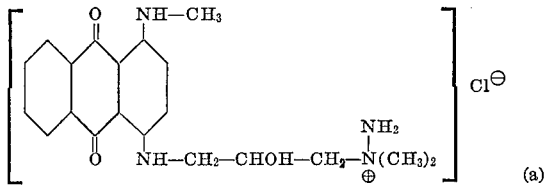

and in British Patent 807,241, claim 3, a basic anthraquinone dye of formula

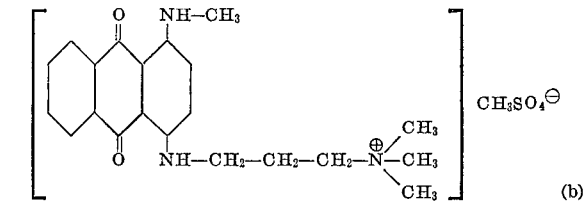

These two dyes are stated to be suitable for dyeing polyacrylonitrile fibres among other materials.

It was surprising and could not be foreseen that dyes of Formula I are equally well suited for the dyeing of polyacrylonitrile textiles at high temperatures. They can be applied to these fibres at temperatures up to 130° C. without undergoing appreciable decomposition. Therefore the correct shade is obtained even at these high temperatures, whereas the blue dyes of Formulae $a$ and $b$ give dyeings of a redder shade than otherwise when applied in this temperature range.

In the following examples the parts and percentages are by weight and the temperatures are in degrees centigrade.

EXAMPLE 1

35.9 parts of 4-[(2'-((2"-chloro))-ethoxy)-ethylamino]-1-methylaminoanthraquinone are entered into 50 parts of asymmetrical dimethyl hydrazine, and the mixture is raised to 60–65° and stirred at this temperature for 4 hours. Then 250 parts of toluene are added dropwise, causing the dye to settle out in crystalline form. It is filtered off, washed with toluene until the effluent is colourless, and dried at once.

The dye is obtained as a blue powder which gives dyeings of light blue shade on polyacrylonitrile and acrylonitrile copolymer fibres having excellent all-round fastness. It is highly suitable for high temperature dyeing as it is not decomposed at these temperatures and gives dyeings of the correct shade on the aforenamed fibres.

EXAMPLE 2

A mixture of 35.9 parts of 4-[(2'-((2"-chloro))-ethoxy)-ethylamino]-1-methylaminoanthraquinone, 30 parts of trimethylamine and 300 parts of chlorobenzene is stirred for 72 hours at 95–100°. The reaction product is filtered off, washed with chlorobenzene at 100° and then with ether, and finally dried.

The dye thus obtained is a blue powder which dyes polyacrylonitrile fibres in bright blue shades with good all-round fastness. It is specially suitable for high temperature dyeing.

The structural composition of further dyes which can be produced in accordance with the procedure of Example 1 is set out in Table B. These dyes conform to the formula

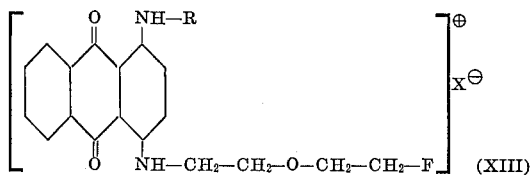

where the radical denoted by F may be replaced by any other of the radicals listed in Table A. The anion $X^{\ominus}$ may be any one of those named in the disclosure.

TABLE A

F in the Formula XIII may represent any one of the following radicals:

$F_1$ for the radical:

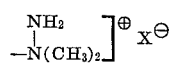

$F_2$ for the radical:

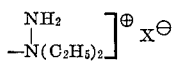

$F_3$ for the radical:

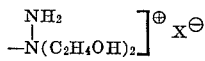

$F_4$ for the radical:

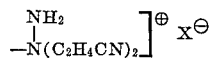

$F_5$ for the radical:

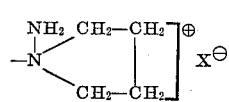

$F_6$ for the radical:

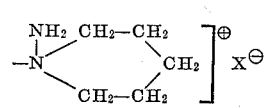

$F_7$ for the radical:

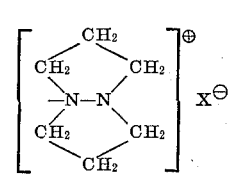

$F_8$ for the radical:

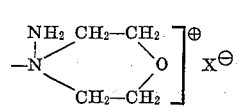

$F_9$ for the radical:

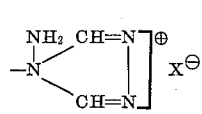

TABLE B

| Example | R | F | Anion $X^{\ominus}$ |
|---|---|---|---|
| 3 | —⬡— | $F_2$ | $Cl^{\ominus}$ |
| 4 | —$CH_3$ | $F_3$ | $Cl^{\ominus}$ |
| 5 | —⬡—H | $F_4$ | $CH_3SO_4^{\ominus}$ |
| 6 | —$CH_3$ | $F_5$ | $Cl^{\ominus}$ |
| 7 | H | $F_1$ | $Cl^{\ominus}$ |
| 8 | —⬡—$CH_3$ | $F_1$ | $Cl^{\ominus}$ |
| 9 | —⬡—$OCH_3$ | $F_1$ | $Cl^{\ominus}$ |
| 10 | —⬡—$CH_3$ (with $CH_3$) | $F_1$ | $CH_3SO_4^{\ominus}$ |
| 11 | —$C_2H_5$ | $F_6$ | $Cl^{\ominus}$ |
| 12 | —$CH_3$ | $F_7$ | $Cl^{\ominus}$ |
| 13 | —$CH_3$ | $F_8$ | $Cl^{\ominus}$ |
| 14 | —⬡—H | $F_9$ | $Cl^{\ominus}$ |
| 15 | —$C_2H_5$ | $F_1$ | $Cl^{\ominus}$ |
| 16 | —$CH_2$—⬡ | $F_1$ | $CH_3SO_4^{\ominus}$ |
| 17 | —⬡—H | $F_1$ | $Cl^{\ominus}$ |
| 18 | —⬡—$CH_3$ (with $CH_3$, $CH_3$) | $F_1$ | $Cl^{\ominus}$ |
| 19 | —⬡—$C_2H_5$ | $F_1$ | $Cl^{\ominus}$ |
| 20 | —⬡—Cl | $F_1$ | $Cl^{\ominus}$ |
| 21 | —⬡—Br | $F_1$ | $Cl^{\ominus}$ |
| 22 | —⬡—$OC_2H_5$ | $F_1$ | $Cl^{\ominus}$ |
| 23 | —⬡—$OC_2H_5$—CN | $F_1$ | $Cl^{\ominus}$ |
| 24 | —⬡— (with $CH_3$, $CH_3$) | $F_1$ | $Cl^{\ominus}$ |

In Table D details are given for the structural composition of further dyes which can be produced in accordance with the particulars given in Example 2. These dyes correspond to the formula

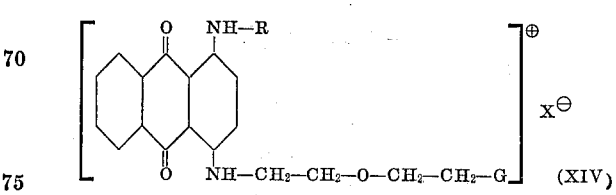

where the radical represented by G may be replaced by any other of the radicals listed in Table C. The anion $X^{\ominus}$ may be any one of those named in the foregoing.

TABLE C

G in the Formula XIV may represent any one of the following radicals:

$G_1$ for the radical:

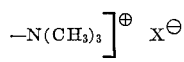

$G_2$ for the radical:

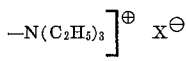

$G_3$ for the radical:

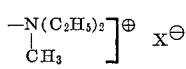

$G_4$ for the radical:

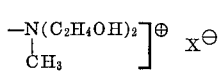

$G_5$ for the radical:

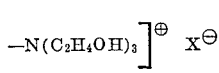

$G_6$ for the radical:

$G_7$ for the radical:

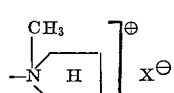

$G_8$ for the radical:

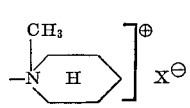

$G_9$ for the radical:

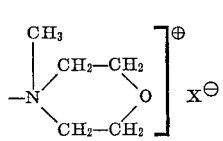

$G_{10}$ for the radical:

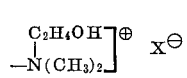

$G_{11}$ for the radical:

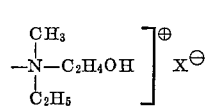

$G_{12}$ for the radical:

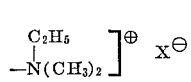

$G_{13}$ for the radical:

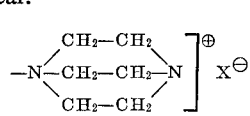

TABLE D

| Example | R | G | Anion $X^{\ominus}$ |
|---|---|---|---|
| 25 | —⬡ | $G_2$ | $Cl^{\ominus}$ |
| 26 | —$CH_3$ | $G_3$ | $Cl^{\ominus}$ |
| 27 | —⬡H | $G_4$ | $CH_3SO_4^{\ominus}$ |
| 28 | —$C_2H_5$ | $G_1$ | $Cl^{\ominus}$ |
| 29 | —$CH_3$ | $G_5$ | $Cl^{\ominus}$ |
| 30 | —⬡—Br | $G_1$ | $Cl^{\ominus}$ |
| 31 | —⬡ (CH_3, CH_3) | $G_1$ | $CH_3SO_4^{\ominus}$ |
| 32 | —⬡ | $G_1$ | $Cl^{\ominus}$ |
| 33 | —⬡H | $G_1$ | $Cl^{\ominus}$ |
| 34 | —⬡ | $G_6$ | $Cl^{\ominus}$ |
| 35 | —$CH_3$ | $G_7$ | $CH_3SO_4^{\ominus}$ |
| 36 | —$C_2H_5$ | $G_8$ | $Cl^{\ominus}$ |
| 37 | —$CH_3$ | $G_9$ | $Cl^{\ominus}$ |
| 38 | —$CH_3$ | $G_{10}$ | $Cl^{\ominus}$ |
| 39 | —⬡H | $G_{11}$ | $Cl^{\ominus}$ |
| 40 | —$CH_3$ | $G_{12}$ | $CH_3SO_4^{\ominus}$ |
| 41 | —$CH_3$ | $G_{13}$ | $Cl^{\ominus}$ |
| 42 | H | $G_1$ | $Cl^{\ominus}$ |
| 43 | —⬡—$CH_3$ | $G_1$ | $Cl^{\ominus}$ |
| 44 | —⬡—$OCH_3$ | $G_1$ | $CH_3SO_4^{\ominus}$ |
| 45 | —⬡—$CH_3$ ($CH_3$) | $G_1$ | $Cl^{\ominus}$ |
| 46 | —⬡—$CH_3$ ($CH_3$, $CH_3$) | $G_1$ | $Cl^{\ominus}$ |
| 47 | —⬡—Cl | $G_1$ | $Cl^{\ominus}$ |
| 48 | —⬡—O—$C_2H_5$—CN | $G_1$ | $Cl^{\ominus}$ |
| 49 | —⬡—$OC_2H_5$ | $G_1$ | $Cl^{\ominus}$ |
| 50 | —$CH_2$—⬡ | $G_1$ | $Cl^{\ominus}$ |

DYEING EXAMPLE A

One part of the dye of Example 1 is dissolved in 4000 parts of distilled water with the subsequent addition of 3 parts of sodium acetate and 2.5 parts of 40% acetic acid solution. This dyebath is raised to 60° in an autoclave, at which temperature 100 parts of a fabric of polyacrylonitrile fibre are entered. The temperature is then increased to 120° over 45 minutes and the fabric dyed at this temperature for a further 45 minutes. A blue dyeing with good all-round fastness is obtained.

DYEING EXAMPLE B

One part of the dye of Example 2 is pasted with 1 part of 40% acetic acid solution. 400 parts of demineralised water at 60° are run on to the paste with stirring and the solution is boiled for a short time. One part of the dyeing preparation thus obtained is diluted with 7000 parts of demineralised water at 60° in an enclosed pressure dyeing machine, on which are added 1.5 parts of sodium acetate and 2.5 parts of 40% acetic acid solution. 100 parts of a fabric of polyacrylonitrile fibre are entered into this bath at 60°. The temperature is increased to 107° in 45 minutes, dyeing is continued at this temperature for a further 45 minutes and the bath then cooled to 60° in 15 minutes. The dyed fabric is removed, rinsed at 35°, expressed between squeeze rollers and dried at 70°. A bright very brilliant blue dyeing with very good fastness properties is obtained. The dyeing remains blue at this temperature without undergoing any shift of shade to red.

If the temperature is increased to 118° under otherwise constant dyeing conditions, the dyeing is brilliant and the correct blue shade is obtained; no change of shade to red occurs even at this temperature.

DYEING EXAMPLE C 20 parts of the dye of Example 1 or 2 and 80 parts of dextrin are intimately ground in a ball mill for 48 hours. One part of the resulting dyeing preparation is pasted with 1 part of 40% acetic acid solution; 400 parts of distilled water are run on to the paste with stirring and the whole boiled for a short time. The solution is then diluted further with 7000 parts of distilled water and 2 parts of glacial acetic acid are added. 100 parts of a fabric of polyacrylonitrile fibre are entered into the bath at 60° and subsequently subjected to treatment for 10–15 minutes at 60° in a bath of 8000 parts of water and 2 parts of glacial acetic acid. The dyebath is raised to 100° in 20 minutes and held at the boil for 1 hour, after which the fabric is rinsed and dried. A blue dyeing with good light and wet fastness properties is obtained.

Formulae of representative dyes of the foregoing examples are as follows:

EXAMPLE 1

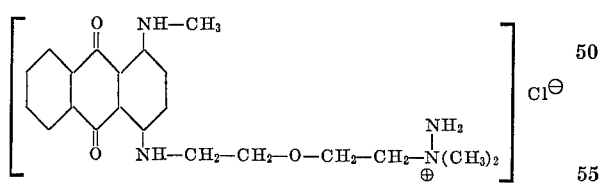

EXAMPLE 2

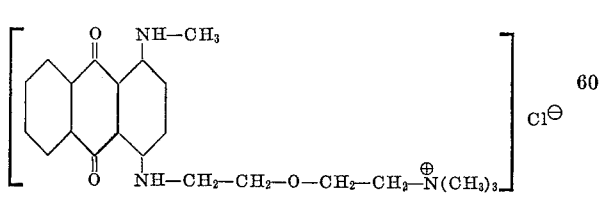

EXAMPLE 8

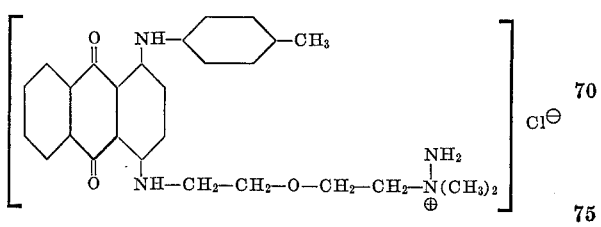

EXAMPLE 9

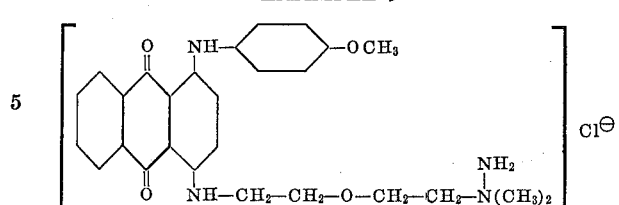

EXAMPLE 17

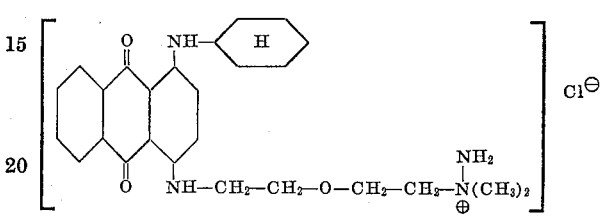

EXAMPLE 43

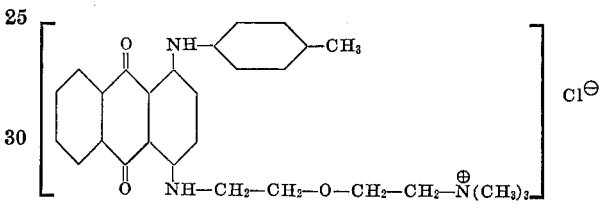

EXAMPLE 44

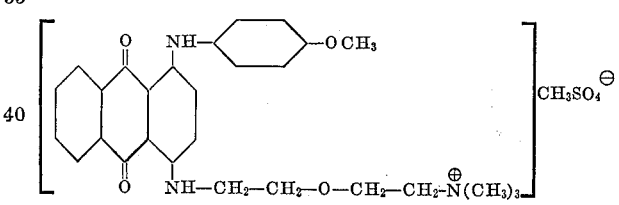

Having thus disclosed the invention what I claim is:
1. Basic anthraquinone dye of the formula

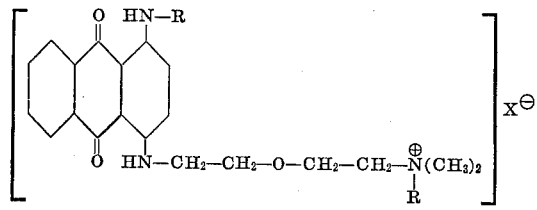

wherein

R is a member selected from the group consisting of methyl, tolyl, methoxyphenylene and cyclohexyl;
R' is a member selected from the group consisting of methyl and —NH$_2$; and
X is a member selected from the group consisting of Cl and CH$_3$SO$_4$.

2. Basic anthraquinone dye according to claim 1 of the formula

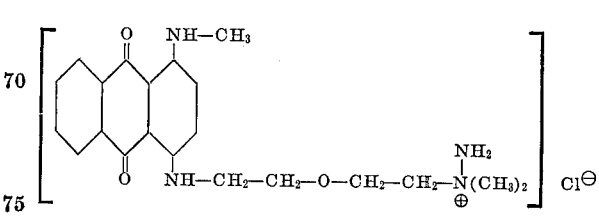

3. Basic anthraquinone dye according to claim 1 of the formula

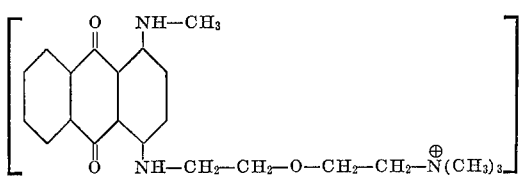

4. Basic anthraquinone dye according to claim 1 of the formula

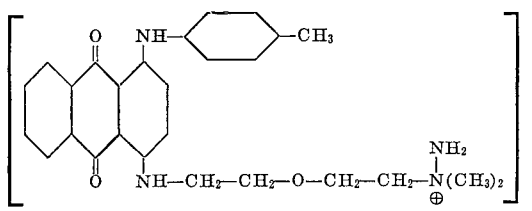

5. Basic anthraquinone dye according to claim 1 of the formula

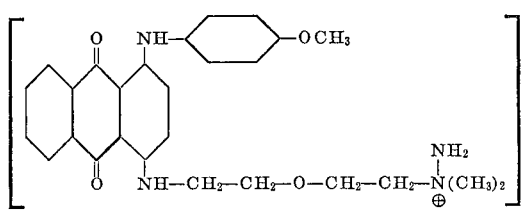

6. Basic anthraquinone dye according to claim 1 of the formula

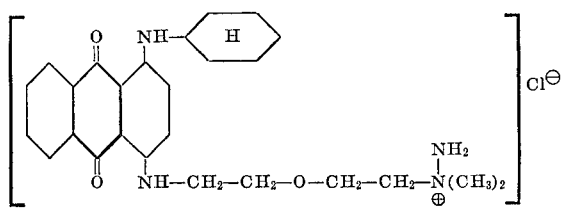

7. Basic anthraquinone dye according to claim 1 of the formula

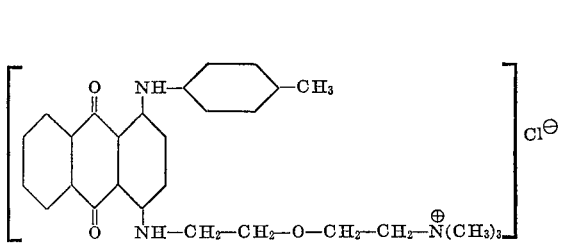

8. Basic anthraquinone dye according to claim 1 of the formula

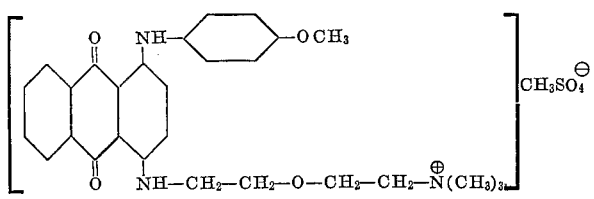

References Cited

UNITED STATES PATENTS 3,123,605  3/1964  Turetzky et al. ___ 260—380 XR

LORRAINE A. WEINBERGER, Primary Examiner

HAROLD C. WEGNER, Assistant Examiner

U.S. Cl. X.R.

8—39; 260—247.5, 262, 268, 272, 308, 311, 326.5

PO-1050
(5/69)

UNITED STATES PATENT OFFICE
CERTIFICATE OF CORRECTION

Patent No. 3,499,916    Dated March 10, 1970

Inventor(s) BERTHOLD GERTISSER

It is certified that error appears in the above-identified patent and that said Letters Patent are hereby corrected as shown below:

Column 2, line 35,

" 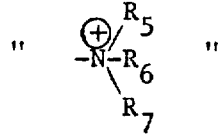 "    should read    -- 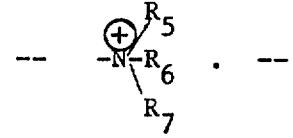 . -- line 63, "$R_3$ or $R_4$" should read --$R_3$ nor $R_4$--; line 65, "unsubstituted nor substituted" should read --unsubstituted or substituted--. Column 3, line 4, "e.g. a chlorine" should read --e.g. a chlorine,--; line 55, "hydrohalyic" should read --hydrohalic--. Column 10, line 55, in the formula " 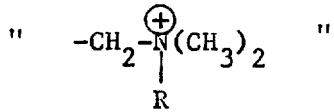 "    should read    -- 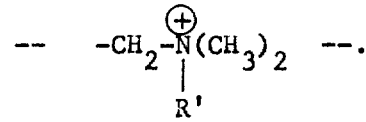 --.

SIGNED AND
SEALED
AUG 11 1970

(SEAL)
Attest:

Edward M. Fletcher, Jr.
Attesting Officer

WILLIAM E. SCHUYLER, JR.
Commissioner of Patents